United States Patent [19]

Kosaka

[11] Patent Number: 5,188,140
[45] Date of Patent: Feb. 23, 1993

[54] BREATHER VALVE
[75] Inventor: Michio Kosaka, Nagoya, Japan
[73] Assignee: Taiyo Giken Kogyo Co., Ltd., Japan
[21] Appl. No.: 888,194
[22] Filed: May 25, 1992
[30] Foreign Application Priority Data
  May 28, 1991 [JP] Japan .................. 3-038562[U]
[51] Int. Cl.$^5$ .......................................... F16K 17/196
[52] U.S. Cl. ...................... 137/12; 137/493; 137/846
[58] Field of Search ................. 137/12, 493, 846

[56] References Cited
U.S. PATENT DOCUMENTS 3,155,110  11/1964  Hoffman ................. 137/846
4,434,810   3/1984  Atkinson ................ 137/493
4,922,954   5/1990  Blomquist .............. 137/493
4,948,092   8/1990  Kasper ............... 137/846 X

OTHER PUBLICATIONS

English abstract of Japanese published examined Utility Model Application No. 60-34850 filed Oct. 17, 1985.
English abstract of Japanese published examined Utility Model Application No. 61-108573 filed Jul. 9, 1986.

Primary Examiner—Robert G. Nilson
Attorney, Agent, or Firm—Davis, Bujold & Streck

[57] ABSTRACT

A breather valve connected to a breather passage for opening and closing a valve element to adjust the internal pressure of a sealed container corresponding to the pressure change inside the sealed container includes a valve bore, the valve element slidably fitted in the valve bore, a spring for pushing the valve element toward the sealed container, an elastic portion tapering toward the sealed container, a slit formed at the free end of the elastic portion, and a needle member extending from the side opposite to the sealed container toward the slit. Plastic deformation caused by pressure reduction inside the sealed container opens the slit while the needle member projects through and opens the slit when increase of the internal pressure of the sealed container pushes the valve element against the pressure of the spring.

18 Claims, 2 Drawing Sheets

BREATHER VALVE

BACKGROUND OF THE INVENTION

The present invention relates to an improved breather valve that controls the internal pressure of a sealed container, such as a fuel tank, by opening or closing a valve element in response to the change of the internal pressure.

The internal pressure of sealed containers, such as fuel tanks for motorcycles and outboard motors, are subject to changes due to fuel comsumption, increase of fuel vapor partial pressure caused by a temperature change, and so forth. Conventionally, various types of breather valves have been proposed to prevent damages caused by such changes of the internal pressure of sealed containers. Japan Published Unexamined Utility Model Application 61-108573 disclosed such a breather valve, in which the inside of the container is connected to the atmosphere via a small bore.

Japan Published Examined Utility Model Application 60-34850 discloses a pressure control valve which prevents gasoline vapor from escaping from a fuel tank into the atmosphere. More specifically, the apparatus includes a breather valve and a breather passage which connects a fuel tank with an absorption unit filled with activated carbon for absorbing gasoline vapor. A negative pressure inside the fuel tank moves the breather valve against the pressure of a spring to connect the fuel tank with the absorption unit and allow air to go into the fuel tank. On the other hand, high pressure inside the fuel tank causes a diaphragm to move against the pressure of another spring. This causes a lever to push onto and detach the valve from a shoulder, thus exhausting the gasoline vapor from the fuel tank to the absorption unit.

These conventional breather valves generally require a complex structure with many components, including a plural springs, a diaphragm, a valve element, and a lever. The diaphragm especially tends to make such a breather valve large in size and thus make it difficult to install the valve in a motorcycle or an outboard motor.

SUMMARY OF THE INVENTION

An object of the present invention is to overcome the above-identified problems inherent in the conventional apparatuses and provide an improved breather valve which is simple in construction and small in size.

According to the present invention made to achieve the above object, a breather valve connected to a breathing passage for opening and closing a valve element to adjust the internal pressure of a sealed container, corresponding to the pressure change inside the sealed container, comprises a valve bore connected to the breather passage, the valve element slidably fitted inside the valve bore, a spring for pushing the valve element toward the sealed container, an elastic portion tapering toward the sealed container, the elastic portion being formed on the valve element, a suction and exhaust slit formed at the free end of the elastic portion, the suction and exhaust slit being able to open due to plastic deformation caused therein by pressure reduction inside the sealed container for opening the breather passage, and a needle member extending from the side opposite to the sealed container toward the suction and exhaust slit, the needle member being able to extend into and open the suction and exhaust slit, when a rise of the internal pressure of the sealed container slides the valve element against the pressure of the spring.

The present invention more specifically relates to a breather valve, for connection to a breathing passage of a sealed container to compensate for internal pressure variations of the sealed container, the breathing valve comprising a valve casing, a valve bore extending through the valve casing and communicating with the breathing passage, a valve element slidably received within the valve bore, an elastic portion, supported by an end of the valve element adjacent the breathing passage, tapering away from the valve element, and a suction and exhaust slit being formed in the tapered end of the elastic portion, the suction and exhaust slit opening, due to plastic deformation, when pressure inside the sealed container is at a pressure lower than that of the atmosphere thereby to allow communication between the breathing passage and the atmosphere, spring means for biasing the valve element toward the breathing passage, and a needle member being at least partially positioned inside the valve bore adjacent an end remote from the breathing passage, the needle member extending toward but being spaced from the suction and exhaust slit, the needle member extending through and at least partially opening the suction and exhaust slit when the internal pressure of the sealed container increases sufficiently so as to force the valve member to slide within the valve bore, against the bias of the spring means, toward the needle member.

During operation, the breather valve thus constructed maintains the suction and exhaust slit closed when the pressure difference between the internal pressure of the sealed container and the atmospheric pressure is small, blocking the connection between the breather passage and the atmosphere. When the internal pressure of the sealed container decreases, the resultant pressure difference causes plastic deformation of the valve element to open the suction and exhaustion slit. This connects the sealed container and the atmosphere, hence preventing the pressure difference therebetween from getting too great.

On the other hand, when the internal pressure of the sealed container increases, the resultant pressure difference moves the valve element toward the needle member against the pressure of the spring. The amount of the movement of the valve element depends on the pressure difference; when the pressure difference reaches a predetermined value, the needle member projects through and opens the suction and exhaust slit. This connects the sealed container and the atmosphere to prevent the pressure difference therebetween from getting too great.

BRIEF EXPLANATION OF THE ATTACHED DRAWINGS

DETAILED DESCRIPTION OF THE PREFERRED EMBODIMENT

A preferred embodiment of the present invention will be hereinafter explained with specific reference to the attached drawings.

Figure 1:
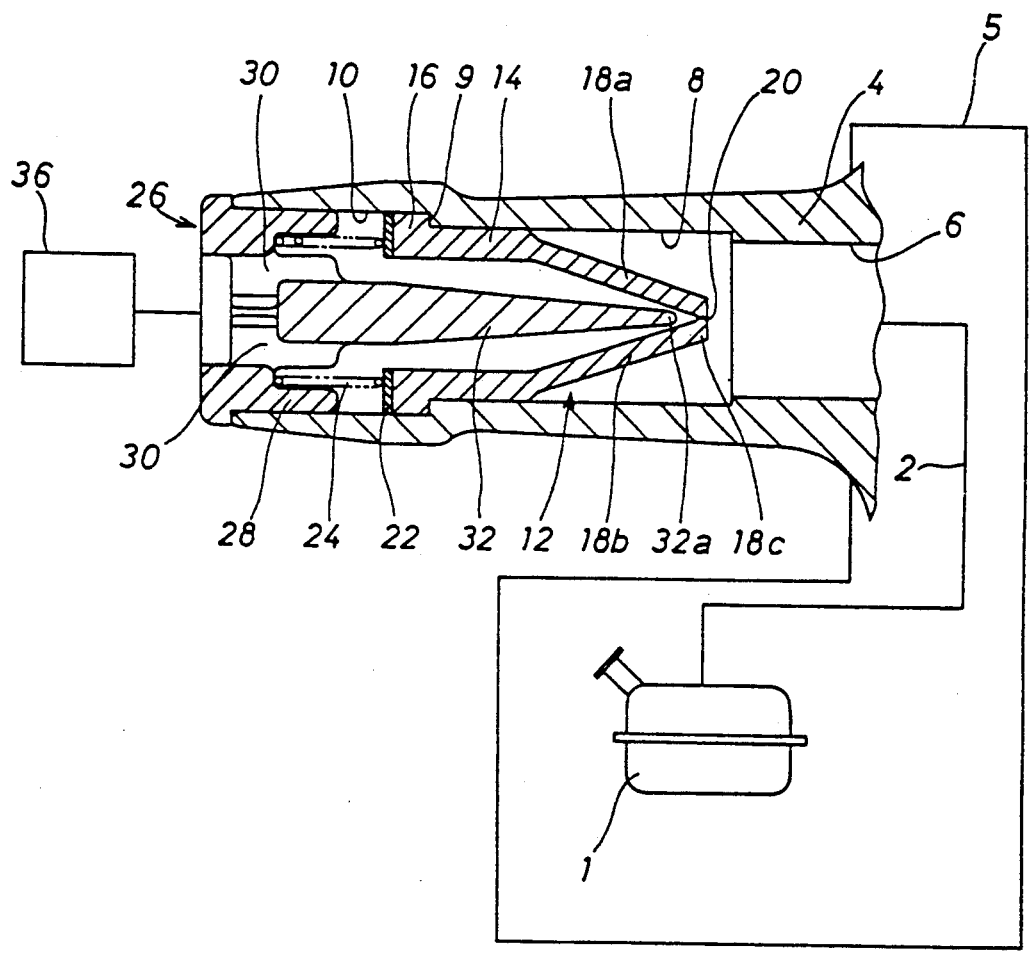
FIG. 1 shows a cross sectional view of a breather valve of an embodiment according to the present invention.

FIG. 1 shows a cross sectional view of a breather valve of the present invention. Indicated by reference numeral 1 is a sealed container such as a fuel tank. A first end of a breather passage 2 is connected to the sealed container 1. The other (second) end of the breather passage 2 is connected to a connection conduit 6 formed in a cylindrical valve case (casing) 4. The valve case 4 is integrally constructed on a fuel switch cock of a motorcycle or other motorized vehicle 5.

A valve bore 8 is formed adjacent to the connection conduit 6. Further, a through (second) bore 10, with a greater diameter than the diameter of the valve bore 8, is formed adjacent to the valve bore 8 and separated via a step 9. A hollow cylindrical portion 14 of a valve element 12 is slidably inserted into the valve bore 8. The cylindrical portion 14 has a flange 16 formed at the through-bore end thereof. The flange is closely slidably received within the through bore 10.

A hollow elastic member 18 extends from the end of the cylindrical portion 14 opposite the flange 16. The elastic member 18 comprises an upper (first) flat or surface side 18a, a lower (second) flat side or surface 18b, and a flat end 18c. The distance between the upper and lower flat sides 18a and 18b is reduced or tapers until they come into contact with each other to form the flat end 18c. A suction and exhaust slit 20 (hereinafter slit 20) is formed in the flat end 18c. In this embodiment, the valve element 12 is made of an elastic body such as synthetic rubber.

The upper and lower flat sides 18a and 18b are designed such that the slit 20 closes when the inside (sealed container side) pressure and outside (atmosphere) pressure of the both flat sides 18a and 18b are approximately equal to one another. When the difference between the inside pressure and the outside pressure reaches 500 mmAq, the upper and lower flat sides 18a and 18b separate from each other to open the slit 20.

After the flange 16 has been inserted in the cylindrical valve case 4, a washer 22 and a coiled spring 24, in that order, are inserted into the through bore 10. Then, a cylindrical portion 28 of a needle member 26 is fixedly secured within the through bore 10 of the valve case 4. The coiled spring 24 pushes the valve element 12 so that the flange 16 is pressed against the step 9.

Figure 2:
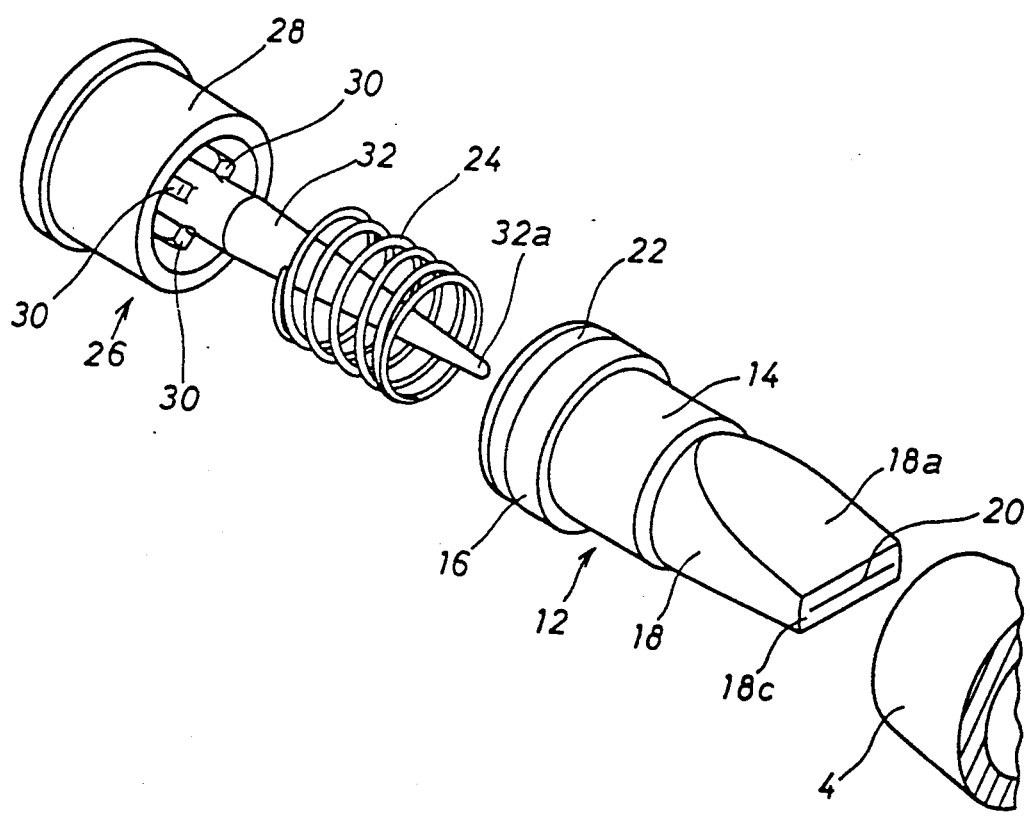
FIG. 2 shows a perspective exploded view of the breather valve of FIG. 1.

The cylindrical portion 28 has four ribs 30 (only three are shown in FIG. 2) extending inwardly from the inner surface thereof toward the center of the cylindrical portion thereof. The four ribs 30 are spaced around the inner surface at equal intervals. The four ribs 30 support a needle 32 extending coaxially with the cylindrical portion 28.

The needle 32 tapers as it extends from the ribs 30 through the cylindrical portion 14 between the upper and lower flat sides 18a and 18b with a tip 32a, once properly positioned, located closely adjacent to the slit 20.

When the pressure of the sealed container side becomes greater than the pressure of the needle member side, the pressure difference pushes the valve element 12 against the pressure of the coiled spring 24. The force of the coiled spring 24 is predetermined such that when the pressure difference reaches a predetermined value (0.2 Kg/cm² in this embodiment), the tip 32a of the needle member 32 projects through and opens the slit 20 by separating the upper and lower flat sides 18a and 18b.

An absorption unit 36 which contains activated carbon or the like may be connected to the valve case 4 via a hose or other suitable means. If the contents of the sealed container may be discharged into the atmosphere without filtering, the absorption unit is not necessary.

The operation of the breather valve of the present invention will be hereinafter explained.

When the internal pressure of the sealed container 1 is approximately equal to that of the atmosphere, no substantial pressure difference occurs between the both sides of the upper and lower flat sides 18a and 18b and the slit 20 is maintained closed. Therefore, the valve element 12 blocks the valve bore 8, not allowing the breather passage 2 to connect to the atmosphere and thereby maintaining the sealed container 1 sealed.

When fuel consumption in the sealed container 1 lowers the internal pressure of the container 1, the low pressure acts to open the outside of the upper and lower flat sides 18a and 18b via the breather passage 2, the connection conduit 6, and the valve bore 8. Meanwhile, the atmospheric pressure also acts to open the inside of the upper and lower flat sides 18a and 18b via the cylindrical portion 28, the through bore 10, and the valve element 12.

More specifically, when there is a pressure difference between both sides of the upper and lower flat sides 18a and 18b, such pressure difference increases the distance between the upper and lower flat sides 18a and 18b, because the distance between the flat sides 18a and 18b decreases toward the slit 20, to open the slit 20. In the shown embodiment, a pressure difference of no less than 500 mmAq between both sides of the elastic portion 18 is required to increase the distance between the flats sides to open the slit 20. Then, the opening of the slit 20 connects the sealed container 1 with the atmosphere to introduce fluid into the sealed container 1 via the cylindrical portion 28 of the needle member 26, the through bore 10, the valve element 12, the slit 20, the valve bore 8, the connection conduit 6, and the breather passage 2. This prevents the internal pressure of the sealed container 1 from getting lower than that of the atmospheric pressure by 500 mmAq or more.

In the shown embodiment, because the elastic portion 18 is made of synthetic rubber, the elasticity of the elastic portion 18 can be designated so that a smaller pressure difference causes the slit 20 to open.

When the internal pressure of the sealed container 1 increases due to, for example, an increase in temperature raise therein, the higher pressure acts on the outside of the upper and lower flat sides 18a and 18b via the breather passage 2 and the connection conduit 6. This causes a pressure difference between both sides of the upper and lower flat sides 18a and 18b to close the slit 20.

The pressure difference between the both sides, however, pushes the valve element 12 axially toward the tip 32a of the needle 32 against the pressure of the coiled spring 24. When the pressure difference reaches a predetermined value (0.2 Kg/cm² in this embodiment), the tip 32a projects through the slit 20 to force the upper and lower flat sides 18a and 18b and open the slit 20.

The opening of the slit 20 connects the sealed container 1 with the atmosphere, thus discharging gasoline vapor from inside the sealed container 1 to the atmosphere via the breather passage 2, the connection conduit 6, the valve bore 8, the valve element 12, the through bore 10, and the cylindrical portion 28 of the needle member 26. An absorption unit 36, if connected to the system, will absorb the gasoline vapor, not allowing it to be discharged into the atmosphere.

Although the sealed container 1 is a fuel tank in the shown embodiment, the present invention may be applied to various sealed containers including a sealed gear box filled with lubricating oil.

As explained above, in the breather valve of the present embodiment, the slit 20 formed at the end 18c of the elastic member 18 opens to adjust the internal pressure of the sealed container 1 when the internal pressure lowers below a predetermined level. On the other hand, when the internal pressure rises above a predetermined level, the valve element 12 is pushed against the force of the coiled spring 24 to force the needle 32 to project through the slit 20. This opens the slit 20, hence reducing the pressure difference.

To prevent the internal pressure of the sealed container 1 from becoming too low, the present invention adopts the above-explained simple structure of the elastic member tapering toward the sealed container 1 and having the slit 20 at the tapered end. To prevent the internal pressure of the sealed container 1 from becoming too great, the embodiment adopts the simple structure and mechanism in which the valve element 12 is pushed against the force of the coiled spring 24 so that the needle 32 projects through and open the slit 20.

The breather valve of the present invention has the valve element 12, the spring 24, and the needle member 26 installed in line in the valve bore 8 and the through bore 10. This simple, convenient structure allows the breather valve to be easily installed in a passage, or in the fuel tank of a motorcycle or an outboard motor.

While the described present invention represents the preferred form of the present invention, it should be understood that changes and variation may be made without departing from the spirit and the scope of the invention.

As described, the breather valve of the present invention includes an elastic member tapering toward the sealed container and a suction and exhaust slit formed at the end of the elastic member. The valve element is pushed against the force of the spring to cause the needle member to open the slit. This simple structure realizes size-reduction and easy installation of the breather valve.

What is claimed is:

1. A breather valve, for connection to a breathing passage of a sealed container to compensate for internal pressure variations of the sealed container, said breathing valve comprising:
   a valve casing;
   a valve bore extending through said valve casing and communicating with the breathing passage;
   a valve element slidably received within said valve bore;
   an elastic portion, supported by an end of said valve element adjacent the breathing passage, tapering away from said valve element, and a suction and exhaust slit being formed in the tapered end of said elastic portion, said suction and exhaust slit opening, due to plastic deformation, when pressure inside the sealed container is at a pressure lower than that of the atmosphere thereby to allow communication between the breathing passage and the atmosphere;
   spring means for biasing said valve element toward the breathing passage; and
   a needle member being at least partially positioned inside said valve bore adjacent an end remote from said breathing passage, said needle member extending toward but being spaced from said suction and exhaust slit, said needle member extending through and at least partially opening said suction and exhaust slit when the internal pressure of the sealed container increases sufficiently so as to force said valve member to slide within said valve bore, against the bias of said spring means, toward said needle member.

2. A breather valve according to claim 1, wherein said valve bore is connected to said breathing passage via a connection conduit formed adjacent a first end of said valve casing.

3. A breather valve according to claim 2, wherein a second bore, larger than said valve bore, extends from a second opposite end of said valve casing toward said valve bore and is separated therefrom via a step portion.

4. A breather valve according to claim 3, wherein both said valve bore and said second bore are cylindrical bores concentrically aligned with one another.

5. A breather valve according to claim 4, wherein said valve element has a flange sized to be slidably received within said second bore and abut against said step portion.

6. A breather valve according to claim 5, wherein a cylindrical portion supports said needle member at least partially within said valve bore and said cylindrical portion is sized to be closely received within said second bore for securely positioning said needle member within said breather valve.

7. A breather valve according to claim 6, wherein four equally spaced ribs, extending from an inner surface of said cylindrical portion, support said needle member within said breather valve.

8. A breather valve according to claim 7, wherein said needle member tapers from said ribs toward a free end of said needle member located adjacent said breathing passage.

9. A breather valve according to claim 1, wherein the taper of said elastic portion comprises opposed first and second flat surfaces, each of said first and second flat surfaces having a first end connected to said valve element an opposite end thereof tapering toward the breathing passage, said first and second surfaces tapering until they contact one another and form a flat end defining said suction and exhaust slit therein.

10. A breather valve according to claim 9, wherein said elastic portion is formed from synthetic rubber.

11. A breather valve according to claim 1, wherein a washer is positioned between said spring means and said valve element.

12. A breather valve according to claim 1, wherein said spring means is a coil spring.

13. A breather valve according to claim 1, wherein spring means maintains said needle member spaced from said suction and exhaust slit until a sufficient internal pressure is present to overcome the biasing force of said spring means and thereby at least partially opening said suction and exhaust slit.

14. A breather valve according to claim 13, wherein the biasing force of said spring means is about 0.2 kilograms/centimeter$^2$.

15. A breather valve according to claim 1, wherein the taper of said suction and exhaust slit facilitates opening of said suction and exhaust slit when the internal pressure of the sealed container is less than atmospheric.

16. A breather valve according to claim 1, wherein an absorption unit, for absorbing vapor which is exhausted from the sealed container, is connected adjacent the end of said valve casing remote from the breathing passage.

17. A breather valve according to claim 1, wherein said breather valve is integrally connected to a motorized vehicle.

18. A method of compensating for internal pressure variations of a sealed container via a breathing passage connected to the sealed container, said breathing valve comprising a valve casing; a valve bore extending through said valve casing and communicating with the breathing passage; a valve element slidably received within said valve bore; an elastic portion, supported by an end of said valve element adjacent the breathing passage, tapering away from said valve element, and a suction and exhaust slit being formed in the tapered end of said elastic portion, said suction and exhaust slit opening, due to plastic deformation, when pressure inside the sealed container is at a pressure lower than that of the atmosphere thereby to allow communication between the breathing passage and the atmosphere; spring means for biasing said valve element toward the breathing passage; and a needle member being at least partially positioned inside said valve bore adjacent an end remote from said breathing passage, said needle member extending toward but being spaced from said suction and exhaust slit, said needle member extending though and at least partially opening said suction and exhaust slit when the internal pressure of the sealed container increases sufficiently so as to force said valve member to slide within said valve bore, against the bias of said spring means, toward said needle member;

said method comprising the steps of:

connecting said breathing valve to a breathing passage;

allowing said suction and exhaust slit to open when pressure inside the sealed container is at a pressure lower than that of atmospheric thereby to allow communication between the breathing passage and the atmosphere;

allowing said valve element to slide within said valve bore, against the bias of said spring means toward said needle member, when the internal pressure of the sealed container increases sufficiently so that said needle member extends through and at least partially opening said suction and exhaust slit and allows communication between the breathing passage and the atmosphere.

* * * * *